United States Patent
Umeyama et al.

(10) Patent No.: US 10,290,842 B2
(45) Date of Patent: May 14, 2019

(54) PRODUCING METHOD OF SEALED BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Ichiro Murata, Settsu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 305 days.

(21) Appl. No.: 15/243,345

(22) Filed: Aug. 22, 2016

(65) Prior Publication Data

US 2017/0062866 A1    Mar. 2, 2017

(30) Foreign Application Priority Data

Aug. 26, 2015   (JP) .................................. 2015-166918

(51) Int. Cl.
| | |
|---|---|
| *H01M 10/04* | (2006.01) |
| *H01M 10/058* | (2010.01) |
| *H01M 2/30* | (2006.01) |
| *H01M 10/0525* | (2010.01) |
| *H01M 2/34* | (2006.01) |
| *H01M 2/06* | (2006.01) |
| *H01M 2/26* | (2006.01) |

(52) U.S. Cl.
CPC ............... *H01M 2/06* (2013.01); *H01M 2/26* (2013.01); *H01M 2/345* (2013.01); *H01M 10/058* (2013.01); *H01M 10/0525* (2013.01)

(58) Field of Classification Search
None
See application file for complete search history.

(56) References Cited

U.S. PATENT DOCUMENTS

2013/0196191 A1*   8/2013   Arai ........................ H01M 2/06
                                                              429/61

FOREIGN PATENT DOCUMENTS

| CN | 202749423 U | | 2/2013 |
|---|---|---|---|
| JP | 2015060705 | * | 3/2015 |
| JP | 2015-125798 A | | 7/2015 |
| JP | 2015138671 | * | 7/2015 |

OTHER PUBLICATIONS

JP2015060705 English translation. Tanaka et al. Japan Mar. 30, 2015 (Year: 2015).*
JP2015138671 English translation. Nakamura et al. Japan Jul. 30, 2015 (Year: 2015).*

* cited by examiner

*Primary Examiner* — Jonathan G Leong
*Assistant Examiner* — Christopher P Domone
(74) *Attorney, Agent, or Firm* — Sughrue Mion, PLLC

(57) ABSTRACT

During joining, while the inversion plate is inserted in a recessed portion of the connecting member and an opening of the recessed portion faces upward in a vertical direction, a boundary at which an inner wall surface of the recessed portion faces an outer side surface of the inversion plate is continuously radiated with a laser beam from above by one round or more. The inner wall surface in a circular shape of the connecting member is an inclined surface inclined further apart from the outer side surface of the inversion plate as the inclined surface is located closer to the laser beam radiation side, and the inclined surface satisfies $w/(h \cdot D) \geq 0.002$ (w: a length of the inclined surface in a radial direction, h: a height of the inclined surface, D: a diameter of the inclined surface on an opposite side to the laser beam radiation side).

4 Claims, 12 Drawing Sheets

FIG. 13

| | POSITION OF INCLINED SURFACE | w [mm] | w/(h·D) | WIDTH OF JOINED PORTION [mm] | NUMBER OF SPLASH OCCURRENCES | NUMBER OF LEAK FAILURE OCCURRENCES |
|---|---|---|---|---|---|---|
| EXAMPLE 1 | SIDE SURFACE OF INVERSION PLATE | 0.020 | 0.004 | 0.7 | 0 | 0 |
| EXAMPLE 2 | SIDE SURFACE OF INVERSION PLATE | 0.060 | 0.011 | 0.7 | 0 | 0 |
| EXAMPLE 3 | SIDE SURFACE OF INVERSION PLATE | 0.100 | 0.019 | 0.7 | 0 | 0 |
| EXAMPLE 4 | INNER WALL SURFACE OF RIVET RECESS | 0.020 | 0.004 | 0.7 | 0 | 0 |
| EXAMPLE 5 | SIDE SURFACE OF INVERSION PLATE | 0.020 | 0.004 | 1.1 | 0 | 0 |
| EXAMPLE 6 | SIDE SURFACE OF INVERSION PLATE | 0.100 | 0.019 | 1.1 | 0 | 0 |
| EXAMPLE 7 | SIDE SURFACE OF INVERSION PLATE | 0.050 | 0.009 | 0.6 | 0 | 2 |
| EXAMPLE 8 | SIDE SURFACE OF INVERSION PLATE | 0.150 | 0.028 | 1.2 | 0 | 2 |
| COMPARATIVE EXAMPLE 1 | SIDE SURFACE OF INVERSION PLATE | 0.005 | 0.001 | 1.2 | 1 | 0 |
| COMPARATIVE EXAMPLE 2 | SIDE SURFACE OF INVERSION PLATE | 0.005 | 0.001 | 1.1 | 1 | 0 |
| COMPARATIVE EXAMPLE 3 | NONE | — | — | 0.9 | 3 | 1 |
| COMPARATIVE EXAMPLE 4 | SIDE SURFACE OF INVERSION PLATE | 0.050 | 0.009 | 0.9 | 11 | 11 |

PRODUCING METHOD OF SEALED BATTERY

INCORPORATION BY REFERENCE

The disclosure of Japanese Patent Application No. 2015-166918 filed on Aug. 26, 2015 including the specification, drawings and abstract is incorporated herein by reference in its entirety.

BACKGROUND OF THE INVENTION

1. Field of the Invention

The present invention relates to a producing method of a sealed battery. More specifically, the present invention relates to a producing method of a sealed battery including a current interrupt device (CID) in a battery case.

2. Description of Related Art

Sealed secondary batteries might experience abnormal increase in internal pressure over their normal ranges due to some abnormalities. To cope with this, there have been provided secondary batteries including CIDs that operate at higher internal pressures than normal internal pressures of the secondary batteries.

Some CIDs of secondary batteries include inversion plates made of metal plates each of which has a circular outer shape, and is provided at its center portion with a convex portion that is convex toward one side of front and back surfaces of the metal plate. Specifically, a central convex portion of an inversion plate of a CID is configured to be in contact with an internal terminal connected to an electrode body inside a secondary battery if an internal pressure of the secondary battery is in a normal state. Accordingly, if the internal pressure of the secondary battery is in a normal state, a current path at a position of the CID is put in a connected state.

Meanwhile, if the internal pressure of the secondary battery is increased up to its operating pressure, the inversion plate is inversely deformed due to the internal pressure so as to generate a gap between the convex portion at the center of the inversion plate and the internal terminal. Specifically, if the internal pressure of the secondary battery becomes increased up to its operating pressure, the CID operates so as to cut off the current path at the position of the CID. The secondary battery with the CID in operation is configured to prevent further charging and discharging.

An example of prior art references about the secondary battery including the above CIDs may be Japanese Patent Application Publication No. 2015-125798, for example. JP 2015-125798 A describes a secondary battery including a CID configured such that an inversion plate having a circular outer shape and a convex portion formed at its center is fitted into a recessed portion in a circular shape of a rivet, and the plate and the rivet are then joined together. The inversion plate and the rivet are joined together by welding an outer edge of the inversion plate.

FIG. 14 shows a sectional view in a radial direction of a rivet 90 and an inversion plate 80 fitted in a recessed portion 91 of the rivet 90. Each of the recessed portion 91 and the inversion plate 80 is formed in a circular shape. The inversion plate 80 includes a circumferential edge 83 located radially outward, and a central portion surrounded by the circumferential edge 83, and this central portion becomes convex upward. While a first surface 81 faces upward, the inversion plate 80 is inserted until a second surface 82 of the circumferential edge 83 comes into contact with a bottom surface 93 of the recessed portion 91. With the state shown in FIG. 14, generally, the inversion plate 80 and the rivet 90 are joined together by laser beam welding that radiates a laser beam from above to a boundary between the inversion plate 80 and the rivet 90 at which a side surface 84 of the inversion plate 80 faces an inner wall surface 92 of the recessed portion 91. In the laser beam welding, the boundary between the inversion plate 80 and the rivet 90 is scanned by at least one round with the laser beam. This is for the purpose of joining the inversion plate 80 and the rivet 90 together with no gap therebetween.

As shown in FIG. 14, the side surface 84 of the inversion plate 80 is often so formed as to be an inclined surface inclined in a direction further apart from the inner wall surface 92 of the recessed portion 91 as this side surface is located at a position closer to the bottom surface 93 of the rivet 90. This is because the side surface 84 of the inversion plate 80 is set to be an inclined surface as shown in FIG. 14 so as to set a distance between the inner wall surface 92 of the recessed portion 91 and the side surface 84 of the inversion plate 80 to be narrower as this distance is located at an upper position toward the laser beam radiation side, thereby increasing a joint strength therebetween.

Unfortunately, if the side surface 84 of the inversion plate 80 is set to be an inclined surface inclined in a direction further apart from the inner wall surface 92 as the side surface 84 is located at a position closer to the bottom surface 93, as shown in FIG. 14, a space Z is formed between the inversion plate 80 and the recessed portion 91 of the rivet 90. Specifically, the space Z is formed at a position surrounded by the inclined side surface 84 of the inversion plate 80, the inner wall surface 92 of the recessed portion 91, and the bottom surface 93 of the recessed portion 91. The space Z is formed along the side surface 84 of the inversion plate 80 by one round, generally in a ring form. This space Z in a ring form is a space that slightly opens only in a gap at an upper position between the side surface 84 and the inner wall surface 92, and is an almost closed space from the outside.

In the laser beam welding, the space Z in a ring form between the inversion plate 80 and the recessed portion 91 is gradually charged with a molten portion flowing therein continuously from a starting position of the laser beam radiation. Hence, a gas in the space Z is sent by the molten portion with which the space Z is charged along the space Z frontward in an advancing direction of the laser beam. This is because the space Z is an almost closed space from the outside.

As shown in a sectional view of the advancing direction of the laser beam L in FIG. 15, when the laser beam L goes around from a starting position S by one round, and then reaches the starting position S once again, the gas in the space Z is held in between a left end of a joined portion WA hardened at the starting position S and a molten portion M formed by the radiation with the laser beam L. If the side surface 84 of the inversion plate 80 is formed to be an inclined surface as shown in FIG. 14, the joined portion WA is likely to be formed at a position (upper position) located on the laser beam radiation side where the distance between the inner wall surface 92 of the recessed portion 91 and the side surface 84 of the inversion plate 80 is narrower. Hence, as shown in FIG. 15, the left end of the joined portion WA hardened at the starting position S is likely to have a shape projecting leftward as the left end is located at a position closer to the laser beam L radiating side.

Accordingly, subsequent to FIG. 15, along with the shift of the laser beam radiation position, the space Z gradually becomes a space completely closed from the outside by the molten portion M and the left end of the joined portion WA. In addition, the gas inside the completely closed space Z is gradually compressed in accordance with decrease of the space Z along with the shift of the laser beam radiating position. The gas inside the space Z is compressed, and also expands at the same time in accordance with increase in temperature due to the radiation with the laser beam L. Consequently, the enclosed gas might abruptly break the molten portion M, thus splashing a part of the molten portion M all over.

SUMMARY OF THE INVENTION

The present invention provides a producing method of a closed battery capable of suppressing splash at the time of joining an inversion plate.

According to one aspect of the present invention, there is provided a producing method of a sealed battery, and the sealed battery includes a battery case housing an electrode body constituted of positive and negative electrode plates inside the battery case, the battery case including a through-hole; an external terminal located outside the battery case; a current interrupt device disposed between the electrode body and the external terminal, the current interrupt device configured to be in a conductive state to conduct the electrode body to the external terminal at a normal internal pressure time when an internal pressure of the battery case is normal, and configured to be in a cut-off state to cut off the conductivity between the electrode body and the external terminal at an abnormal internal pressure time when the internal pressure of the battery case becomes an operating pressure or more, the current interrupt device located inside the battery case; an internal terminal connected to the electrode body; a connecting member having a first end connected to the external terminal, the connecting member having a second end extending from the first end through the through-hole to the inside of the battery case, the connecting member including a circular recessed portion opening in a surface of the second end and a hole opening in a bottom surface of the recessed portion; and an inversion plate that is a plate member having a circular outer shape, the inversion plate joined, in a state in which the inversion plate is inserted in the recessed portion, to the connecting member at a circumferential edge of the inversion plate located radially outward; in the conductive state, the inversion plate curved at a central portion of the inversion plate surrounded by the circumferential edge in a manner as to be convex toward the internal terminal so that at least a part of a central portion is connected to the internal terminal; in the cut-off state, the inversion plate inversely deformed such that the central portion moves apart from the internal terminal to generate a gap between the central portion and the internal terminal so as to cut off the conductivity, and the producing method of the sealed battery includes: inserting the inversion plate into the recessed portion of the connecting member until the circumferential edge comes into contact with the bottom surface of the recessed portion; and in a state in which the inversion plate is inserted in the recessed portion of the connecting member, and the opening of the recessed portion faces upward in a vertical direction, continuously radiating a laser beam from above to a boundary at which an inner wall surface of the recessed portion faces an outer side surface that is a radially outer surface of the inversion plate by one round to form an annular continuous joined portion at a position corresponding to the boundary so as to join the connecting member and the inversion plate together, wherein the inner wall surface in a circular shape of the connecting member is an inclined surface inclined further apart from the outer side surface of the inversion plate as the inclined surface is located closer to a laser beam radiation side, or the outer side surface of the inversion plate is an inclined surface inclined further apart from the inner wall surface in a circular shape of the connecting member as the inclined surface is located closer to the laser beam radiation side, and the inclined surface satisfies a formula: $w/(h \cdot D) \geq 0.002$, where w represents a length of the inclined surface in a radial direction, h represents a height of the inclined surface, and D represents a diameter of the inclined surface on an opposite side to the laser beam radiation side.

In the producing method of the sealed battery according to one aspect of the present invention, one of the inner wall surface of the recessed portion of the connecting member and the outer side surface of the inversion plate is formed to be an inclined surface satisfying the above formula. Hence, at the time of the joining, an upper part of the space between the inner wall surface of the recessed portion and the outer side surface of the inversion plate is opened. At the time of the joining, it is possible to form the inclined surface gradually spreading downward at the end of the joined portion located at the starting position. After the laser beam radiation is carried out from the starting position by one round, and when the molten portion reaches the starting position where the joined portion is already formed, the molten portion comes into contact with the end of the joined portion present at the starting position upwardly from below. Hence, it is possible to suppress the space present between the inner wall surface of the recessed portion and the outer side surface of the inversion plate from being partitioned from the outside by the molten portion and the joined portion. Accordingly, it is possible to suppress the splash at the time of joining the inversion plate.

In the aforementioned producing method of the sealed battery, the inclined surface further satisfying a formula: $w/(h \cdot D) \leq 0.020$ may be used. This is because by setting the distance on the laser beam radiation side between the inner wall surface of the recessed portion and the outer side surface of the inversion plate to be narrow to some extent, it is possible to form a sufficient amount of molten portion by the laser beam radiation. The joined portion having a sufficient width is formed by using sufficient amount of molten portion, thereby suppressing formation of a gap at the position of the joined portion.

In the aforementioned producing method of the sealed battery, after the inversion plate is inserted into the recessed portion of the connecting member until the periphery comes into contact with the bottom surface of the recessed portion, and before the connecting member and the inversion plate are joined together, in a state in which the inversion plate is inserted in the recessed portion of the connecting member, and the opening of the recessed portion faces upward in a vertical direction, part of the boundary may be radiated with the laser beam from above so as to form tentative fixed portions at radiation positions of the laser beam, and each of the tentative fixed portions has a sectional shape in a circumferential direction along the boundary having a shorter length as the sectional shape is located at a position closer to the laser beam radiation side. This is because, in the joining step, it is possible to suppress the splash at the tentative fixed portions during the laser beam radiation, and also suppress deformation of the inversion plate at the time of joining the inversion plate by the tentative fixed portions.

In the aforementioned producing method of the sealed battery, when the connecting member and the inversion plate are joined together, the laser beam may be emitted in a manner as to form the joined portion having a width being within a range of 0.7 mm or more to 1.1 mm or less. This is because by the above joining, it is possible to suppress the deformation of the inversion plate, and form the joined portion having a sufficient joint strength with no gap while leak failure is suppressed.

According to the present invention, provided is the producing method of the sealed battery capable of suppressing the splash at the time of joining the inversion plate.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 13 is a drawing showing Examples and Comparison Examples;

DETAILED DESCRIPTION OF EMBODIMENTS

A preferable embodiment embodying the present invention will be described in details with reference to drawings, hereinafter.

Figure 1:
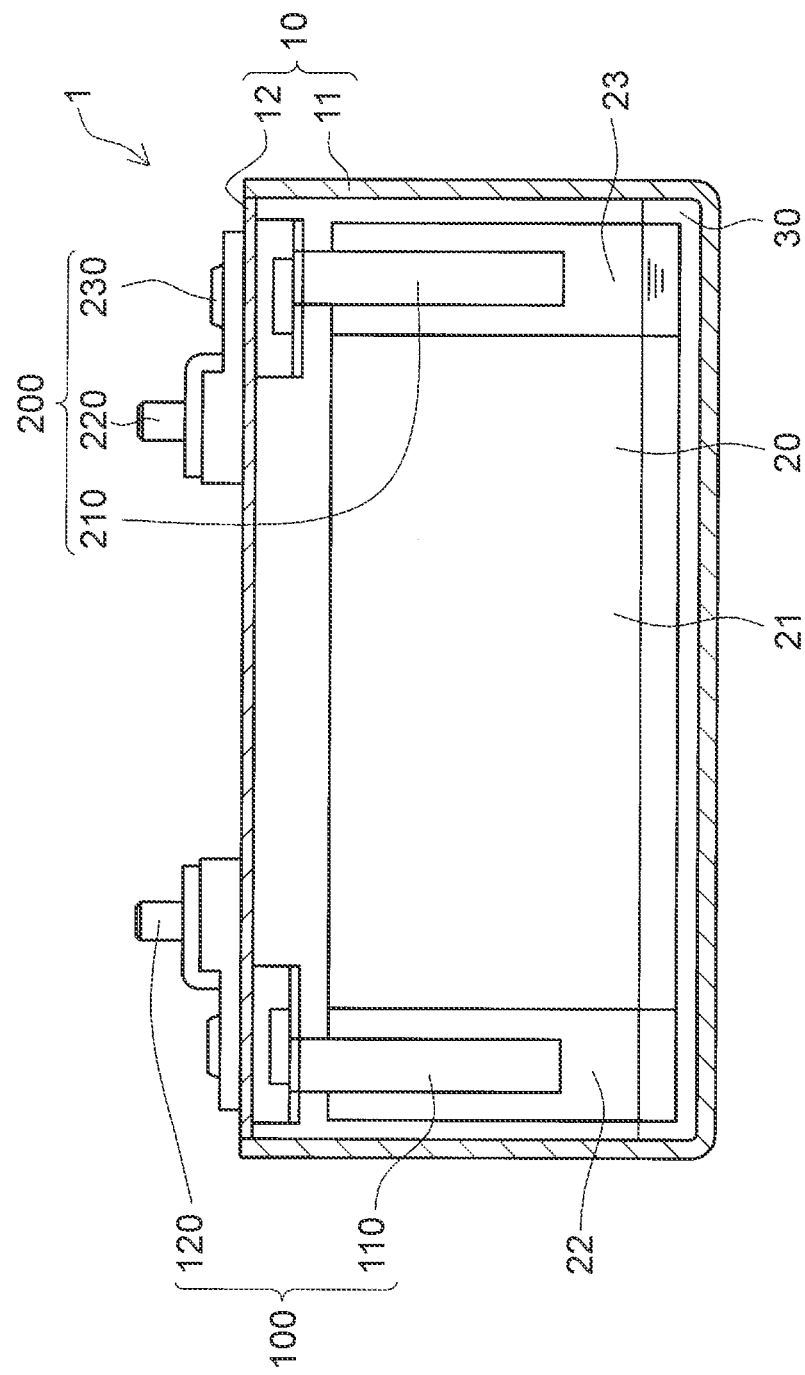
FIG. 1 is a sectional view of a battery.
Figure 2:
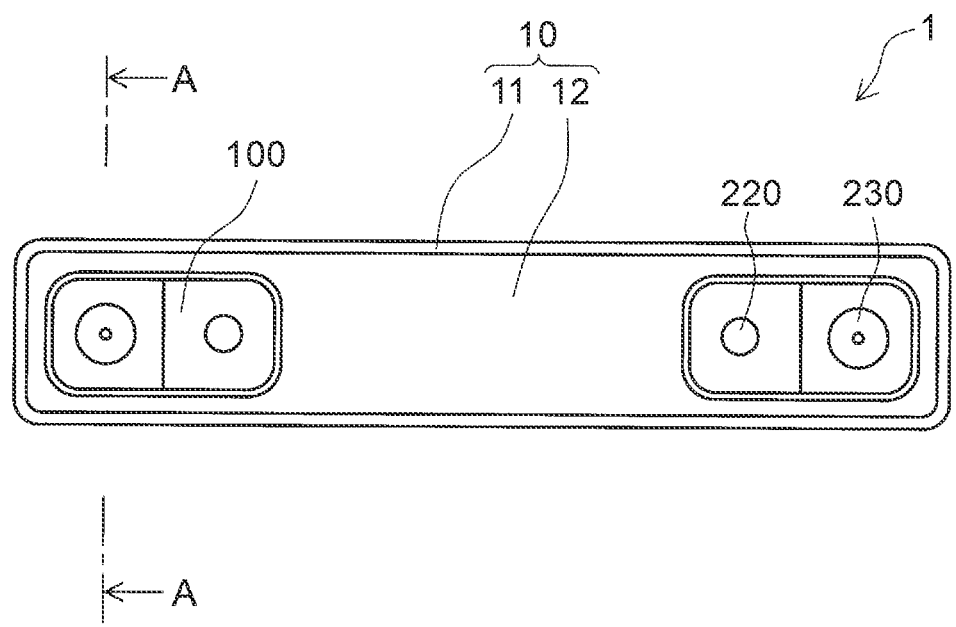
FIG. 2 is a plan view of the battery.

First, a closed battery produced by a producing method according to the present embodiment will be described. FIG. 1 is a sectional view showing a schematic configuration of a battery 1 of the present embodiment. FIG. 2 shows a plan view of the battery 1.

The battery 1 of the present embodiment is a lithium ion secondary battery. As shown in FIG. 1 and FIG. 2, the battery 1 includes a battery case 10 made of metal in a flat form. An electrode body 20 and an electrolyte 30 are housed inside the battery case 10. As shown in FIG. 2, the battery case 10 includes a case body 11, a cover 12 covering an opening located at an upper part of the case body 11. The electrolyte 30 is a nonaqueous electrolyte formed of an organic solvent in which a lithium salt is solved.

The electrode body 20 is constituted of positive and negative electrode plates. The electrode body 20 of the present embodiment is formed by winding the positive electrode plate and the negative electrode plate with a separator interposed therebetween into a flat form, and each of the positive and negative electrode plates is formed by forming an active material layer on a current collector foil. As shown in FIG. 2, the electrode body 20 includes a central portion 21 located at the center, a positive electrode end 22 extending leftward from the central portion 21, and a negative electrode end 23 extending rightward from the central portion 21.

The central portion 21 of the electrode body 20 is formed by overlaid portions of the active material layers on the current collector foils of the positive and negative electrode plates with the separator interposed therebetween. The positive electrode end 22 is a portion formed by only the current collector foil of the positive electrode plate having no active material layer thereon, and the negative electrode end 23 is formed by only the current collector foil of the negative electrode plate having no active material layer thereon.

The battery 1 includes a positive electrode terminal body 100 and a negative electrode terminal body 200. The positive electrode terminal body 100 is located inside the battery case 10, and includes a positive electrode internal terminal 110 connected to the positive electrode end 22 of the electrode body 20, and a positive electrode external terminal 120 located outside the battery case 10. The negative electrode terminal body 200 is located inside the battery case 10, and includes a negative electrode internal terminal 210 connected to the negative electrode end 23 of the electrode body 20, and a negative electrode external terminal 220 located outside the battery case 10. Each of the positive electrode internal terminal 110, the positive electrode external terminal 120, the negative electrode internal terminal 210, and the negative electrode external terminal 220 is made of metal, and has electric conductivity.

In the battery 1 of the present embodiment, the negative electrode terminal body 200 is configured by connecting the negative electrode internal terminal 210 and the negative electrode external terminal 220 via a rivet 230 as shown in FIG. 1 and FIG. 2. The rivet 230 is made of metal, and has electric conductivity. Hence, the negative electrode terminal body 200 is configured to always function as a negative electrode terminal.

Meanwhile, the positive electrode terminal body 100 is provided with a current interrupt device (CID). In the battery 1 of the present embodiment, it is configured that if an internal pressure of the battery case 10 becomes increased up to an operating pressure of the CID or more, which is higher than a normal range of the internal pressure, the CID operates to block the function of the positive electrode terminal body 100. The positive electrode terminal body 100 will be described, hereinafter.

Figure 3:
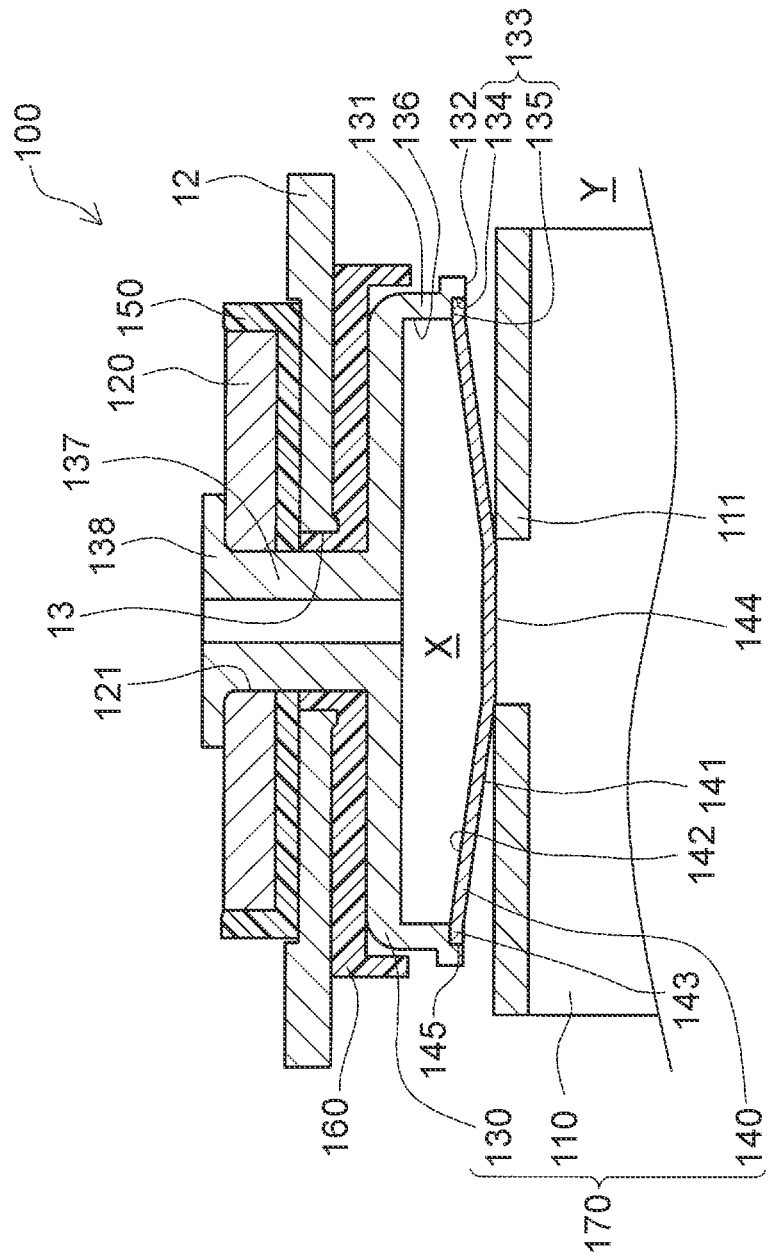
FIG. 3 is a sectional view of a positive electrode terminal.

FIG. 3 shows a sectional view of the positive electrode terminal body 100. FIG. 3 is a sectional view of the positive electrode terminal body 100 taken along line A-A of FIG. 2. In FIG. 3, an area above the cover 12 is located outside the battery 1, and an area below the cover 12 is located inside the battery 1.

As shown in FIG. 3, the positive electrode terminal body 100 includes a rivet 130 and an inversion plate 140 together with the positive electrode internal terminal 110 and the positive electrode external terminal 120. A through-hole 13 is formed in the cover 12 at a position corresponding to the positive electrode terminal body 100. An external insulating member 150 and an internal insulating member 160, which electrically insulate the positive electrode terminal body 100 from the cover 12, are provided at a position corresponding to the positive electrode terminal body 100.

As shown in FIG. 3, a through-hole 121 is formed in the positive electrode external terminal 120 at a position above the through-hole 13 of the cover 12. An external insulating member 150 is provided between the positive electrode external terminal 120 and the cover 12. The external insulating member 150 is formed by a resin member or the like having an electric insulation property. In this manner, the positive electrode external terminal 120 is electrically insulated from the cover 12.

The internal insulating member 160 is so provided as to be in contact with an inner surface of the cover 12 located inside the battery 1. The internal insulating member 160 at its position corresponding to the through-hole 13 of the cover 12 extends along the inner wall surface of the through-hole 13 into an inner side of the through-hole 13. Hence, the internal insulating member 160 is disposed between the rivet 130 and the cover 12 so as to seal a gap therebetween. Accordingly, the inside of the battery 1 is sealed. The internal insulating member 160 is formed by a resin member, a rubber member, or the like having elasticity and an electric insulation property. In this manner, the rivet 130 is electrically insulated from the cover 12.

In the battery 1 of the present embodiment, the CID 170 is constituted of the positive electrode internal terminal 110, the rivet 130, and the inversion plate 140. The CID 170 is configured to be in a conductive state to conduct the electrode body 20 to the positive electrode external terminal 120 at a normal internal pressure time when an internal pressure of the battery 1 that is a pressure of an internal space Y of the battery case 10 is normal. To the contrary, the CID 170 is configured to be in a cut-off state to cut off the conductivity between the electrode body 20 and the positive electrode external terminal 120 at an abnormal internal pressure time when the internal pressure of the battery 1 is equal to an operating pressure of the CID 170 or more due to some abnormality. FIG. 3 shows the conductive state that is the normal internal pressure state.

Figure 4:
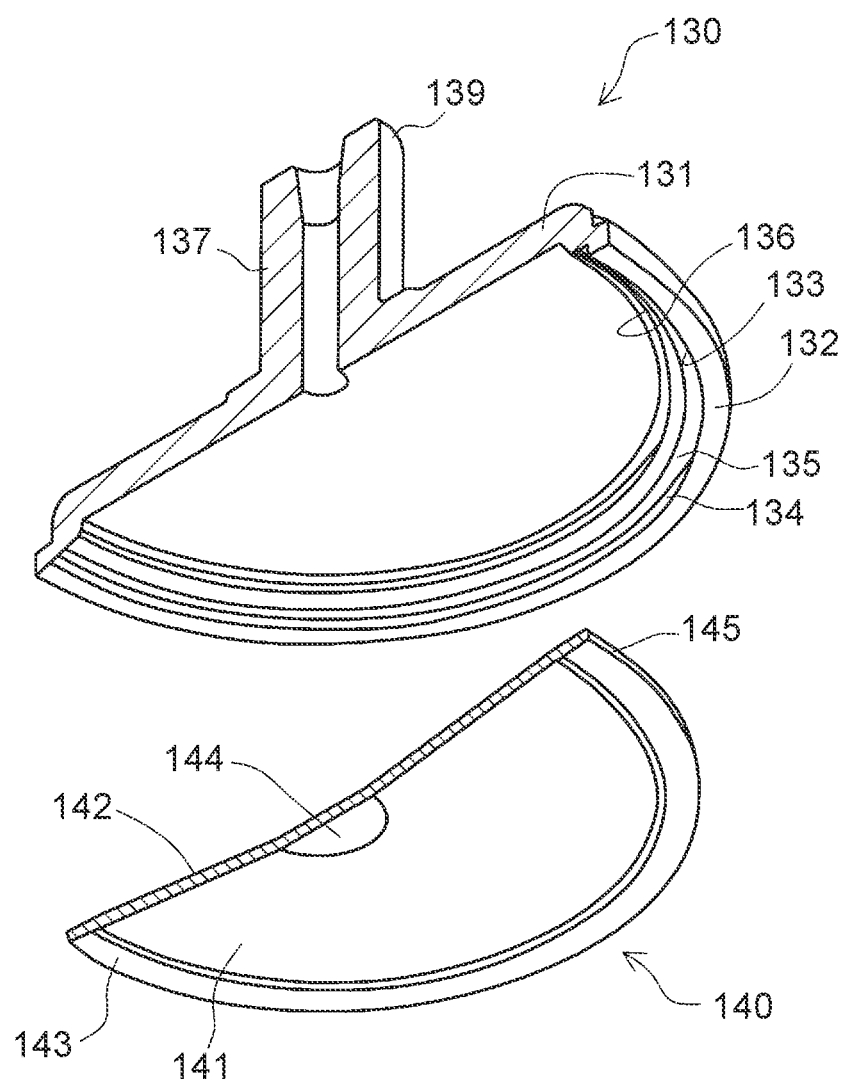
FIG. 4 is a perspective view showing sections of a rivet and an inversion plate.

As shown in FIG. 3, the rivet 130 includes a head 131 and a body 137. The rivet 130 is made of metal, and has electric conductivity. The rivet 130 of the present embodiment is made of aluminum. FIG. 4 shows a perspective view of respective sections of the rivet 130 and the inversion plate 140 before being assembled to the battery 1. As shown in FIG. 4, each of the head 131 and the body 137 has a cylindrical outer shape. As shown in FIG. 3, the head 131 is located inside the battery 1, and the body 137 extends from the inside of the battery 1 through the through-hole 13 of the cover 12 and the through-hole 121 of the positive electrode external terminal 120 to the outside of the battery 1.

As shown in FIG. 4, the body 137 of the rivet 130 before being assembled to the battery 1 has a constant diameter from the head 131 to a front end 139. In a state of being assembled to the battery 1 as shown in FIG. 3, a portion corresponding to the front end 139 of the body 137 of the rivet 130 is squeezed into a squeezed portion 138 having a greater diameter than that of the original portion, as shown in FIG. 3. The rivet 130 is a connecting member of which squeezed portion 138 is connected to the positive electrode external terminal 120.

As shown in FIG. 3, the rivet 130 holds the cover 12, the positive electrode external terminal 120, the external insulating member 150, and the internal insulating member 160 between the head 131 and the squeezed portion 138. The positive electrode external terminal 120, the external insulating member 150, and the internal insulating member 160 are fastened to the cover 12 through this holding by the rivet 130.

A recessed portion 133 opening in a crown surface 132 corresponding to a lower surface in FIG. 3 is formed in the head 131 of the rivet 130. The recessed portion 133 includes an inner wall surface 134 and a bottom surface 135. A bottomed blind hole 136 opening in the bottom surface 135 of the recessed portion 133 is formed in the head 131 of the rivet 130. As shown in FIG. 4, each of the recessed portion 133 and the blind hole 136 that are formed in the head 131 has a circular shape.

As shown in FIG. 4, the body 137 of the rivet 130 has a cylindrical shape. Hence, an internal space X of the blind hole 136 is communicated with the outside of the battery 1 through the inside of the body 137 in a cylindrical shape.

As shown in FIG. 4, the inversion plate 140 is a plate member having a circular outer shape. The inversion plate 140 is made of metal, and has electric conductivity. The inversion plate 140 of the present embodiment is made of aluminum. As shown in FIG. 3, the inversion plate 140 is fitted in the recessed portion 133 of the rivet 130 while a first surface 141 faces the positive electrode internal terminal 110, and a second surface 142 faces the rivet 130. The inversion plate 140 includes a flat circumferential edge 143 located radially outward, and a central portion 144 surrounded by the circumferential edge 143.

The inversion plate 140 is joined to the rivet 130 while the second surface 142 of the circumferential edge 143 is in contact with the bottom surface 135 of the recessed portion 133 of the rivet 130. In the present embodiment, the rivet 130 is joined to the inversion plate 140 by laser-welding a boundary between the rivet 130 and the inversion plate 140 at which the inner wall surface 134 of the recessed portion 133 of the rivet 130 faces a side surface 145 of the inversion plate 140 by one round. This laser-welding will be described in details later. The internal space X of the rivet 130 and the internal space Y of the battery 1 are partitioned from each other by the inversion plate 140.

As shown in FIG. 3, the inversion plate 140 in the normal internal pressure state is curved in a manner as to be convex toward the positive electrode internal terminal 110 more at the central portion 144 than at the circumferential edge 143. The central portion 144 of the inversion plate 140 is inversely deformed to be convex to the opposite side (upward in FIG. 3) when a force equal to or stronger than a predetermined value is applied from the first surface 141 side. Specifically, the inversion plate 140 is configured to be inversely deformed at the abnormal internal pressure time when the internal pressure of the battery 1 becomes equal to or more than the operating pressure of the inversion plate 140.

In the present embodiment, the central portion 144 of the inversion plate 140 inversely deformed comes into a state of being convex toward the internal space X side of the rivet 130. Hence, the internal space X of the rivet 130 is set to be large enough not to come into contact with the inversion plate 140 when the inversion plate 140 is inversely deformed. Specifically, the inversion plate 140 is configured to be prevented from being pushed back by the bottom surface of the blind hole 136 of the rivet 130 when being inversely deformed, for example.

The positive electrode internal terminal 110 includes a conductive portion 111 in contact with the central portion 144 of the inversion plate 140 if the inversion plate 140 is out of the inversely deformed state. Specifically, at the normal internal pressure time as shown in FIG. 3, the first surface 141 of the central portion 144 of the inversion plate 140 is connected to the conductive portion 111 of the positive electrode internal terminal 110. The conductive portion 111 of the positive electrode internal terminal 110 is joined to be connected to the central portion 144 of the inversion plate 140. A joint strength between the conductive portion 111 and the central portion 144 is set to be breakable if the inverse deformation of the inversion plate 140 occurs at the abnormal internal pressure time. This joint allows the positive electrode internal terminal 110 and the inversion plate 140 to be electrically conducted to each other at the normal internal pressure time. As aforementioned, the positive electrode external terminal 120 is connected to the rivet 130, and the rivet 130 is joined to the inversion plate 140. Through this, the CID 170 at the normal internal pressure time is in an electrically conductive state in which the electrode body 20 is electrically conducted to the positive electrode external terminal 120.

Meanwhile, as aforementioned, the central portion 144 of the inversion plate 140 inversely deformed is convex toward the internal space X of the rivet 130. Hence, a gap is generated between the conductive portion 111 of the positive electrode internal terminal 110 and the central portion 144 of the inversion plate 140, thereby bringing the conductive portion 111 and the central portion 144 into a non-contact state at the abnormal internal pressure time. Accordingly, the CID 170 at the abnormal internal pressure time comes into the cut-off state to cut off the electric conduction at the position of the CID 170.

Next, a procedure of joining the rivet 130 and the inversion plate 140 that configure the CID 170 will be described, hereinafter. In the present embodiment, the rivet 130 is joined to the inversion plate 140 in the following procedure: 1. the inserting step; 2. the tentative fixing step; and 3. the joining step.

First, "1. the inserting step" will be described. In this step, the inversion plate 140 is inserted into the inside of the recessed portion 133 of the rivet 130. In this step, as shown in FIG. 4, the rivet 130 and the inversion plate 140 are brought to be close to each other with the crown surface 132 facing the second surface 142 so as to insert the inversion plate 140 into the recessed portion 133 of the rivet 130. In the present embodiment, the inserting step is actually carried out after the squeezed portion 138 is formed in the rivet 130, and the rivet 130 is assembled to the cover 12.

Figure 5:
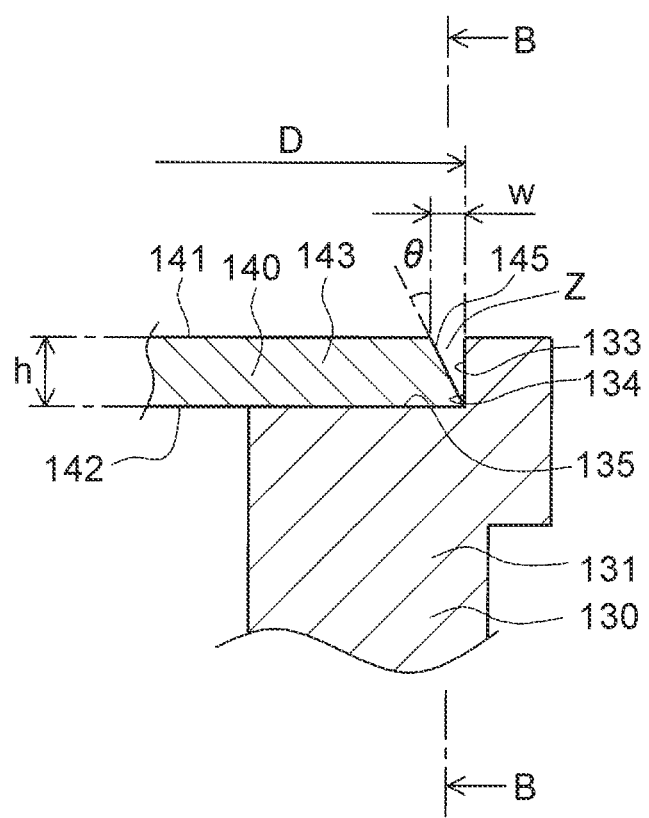
FIG. 5 is a sectional view in a radial direction of the rivet and the inversion plate after insertion.

FIG. 5 shows the sectional view of the rivet 130 and the inversion plate 140 in the radial direction after the inserting step. FIG. 5 is a partial sectional view showing a part where the inner wall surface 134 of the recessed portion 133 of the rivet 130 faces the side surface 145 of the inversion plate 140. As shown in FIG. 5, the inversion plate 140 is inserted into the recessed portion 133 until the second surface 142 of the circumferential edge 143 comes into contact with the bottom surface 135 of the recessed portion 133.

As shown in FIG. 5, the side surface 145 of the inversion plate 140 in the present embodiment is formed to be an inclined surface inclined by an angle θ relative to a thickness direction of the inversion plate 140. The inclination direction of the side surface 145 of the inversion plate 140 is a direction further apart from the inner wall surface 134 of the recessed portion 133 of the rivet 130 as the inclination is closer to the first surface 141. This inclination direction of the side surface 145 of the inversion plate 140 is a direction further apart from the inner wall surface 134 of the recessed portion 133 of the rivet 130 as the side surface 145 is located at a position closer to the laser beam radiation side in the tentative fixing step and the joining step. FIG. 5 shows a diameter D of the side surface 145 on the second surface 142 side, a length w of the side surface 145 in the radial direction, and a height h of the side surface 145. The height h of the side surface 145 represents a thickness of the inversion plate 140.

Meanwhile, the inner wall surface 134 of the recessed portion 133 of the rivet 130 in the present embodiment is formed to be parallel with the depth direction of the recessed portion 133. Hence, in a radial sectional view of FIG. 5, between the inner wall surface 134 of the recessed portion 133 and the side surface 145 of the inversion plate 140, there exists a space Z in a triangular shape becoming narrower as it extends downward. The space Z is formed by one round along the boundary between the rivet 130 and the inversion plate 140 at which the inner wall surface 134 of the recessed portion 133 faces the side surface 145 of the inversion plate 140. Specifically, the space Z is formed in a ring form as a whole. In addition, as shown in FIG. 5, the space Z is not closed but opened at its upper part.

Figure 6:
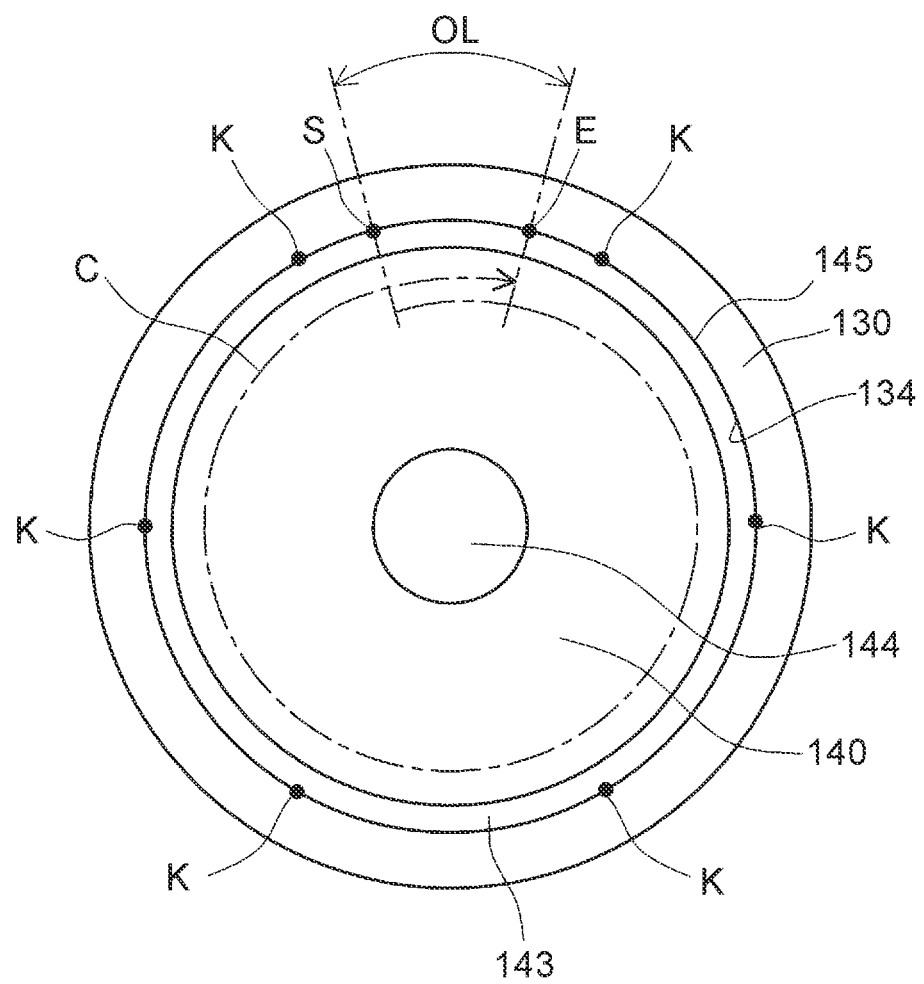
FIG. 6 is a plan view of the rivet and the inversion plate.

Next, "2. the tentative fixing step" is carried out. This step is a step of carrying out the tentative fixing to partially radiate the boundary between the rivet 130 and the inversion plate 140 with the laser beam so as to partially join the rivet 130 to the inversion plate 140 at the radiation positions. FIG. 6 shows a plan view of the rivet 130 and the inversion plate 140 after the inserting step. FIG. 6 shows tentative fixing positions K at which the tentative fixing of this step is carried out. The tentative fixing positions K in the present embodiment are located on the boundary between the rivet 130 and the inversion plate 140, as shown in FIG. 6, and there are six in total. The six tentative fixing positions K are arranged with equal intervals in the circumferential direction.

In the tentative fixing step, all the six tentative fixing positions K are respectively radiated with the laser beam. As shown in FIG. 5, the laser beam is emitted from above while the opening of the recessed portion 133 of the rivet 130 faces upward in the vertical direction. The laser beam radiation melts portions at the tentative fixing positions K that are the radiated positions so as to carry out the tentative fixing.

Figure 7:
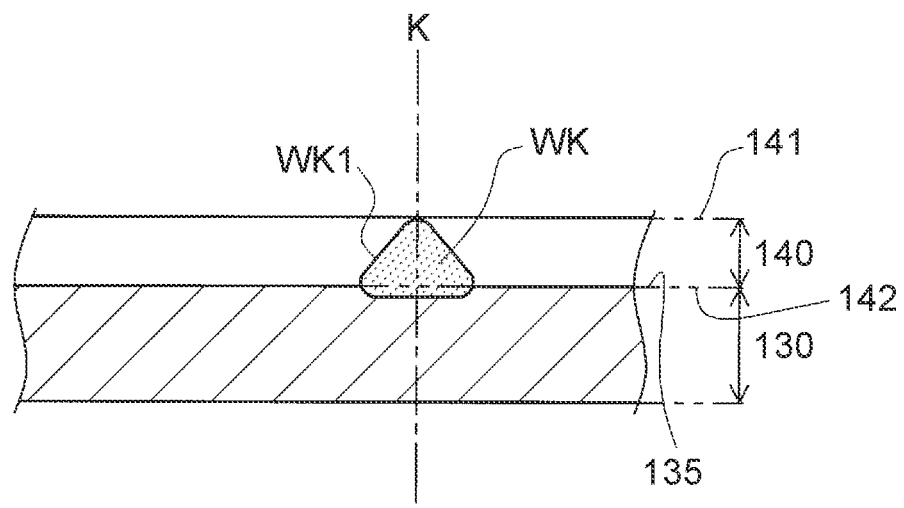
FIG. 7 is a sectional view of a tentative fixed portion.

FIG. 7 shows respective sections of the rivet 130 and the inversion plate 140 that are tentatively fixed to each other. FIG. 7 is a sectional view taken along line B-B of FIG. 5, and is a sectional view in the circumferential direction along the boundary between the rivet 130 and the inversion plate 140. FIG. 7 shows one tentative fixed portion WK formed at the tentative fixing position K in the tentative fixing step. After the tentative fixing step, six tentative fixed portions WK are formed in total.

Each tentative fixed portion WK is formed in such a manner that the vicinity of the boundary between rivet 130 and the inversion plate 140 at the tentative fixing position K is melted by the laser beam radiation, and the molten portion becomes hardened into the tentative fixed portion WK. Hence, each tentative fixed portion WK is formed by mixtures of the vicinity of the inner wall surface 134 of the recessed portion 133 of the rivet 130 and the vicinity of the side surface 145 of the inversion plate 140 at the tentative fixing position K.

As shown in FIG. 7, each tentative fixed portion WK has a mountain-like shape spreading downward in the circumferential direction. Specifically, each tentative fixed portion WK has a shape of which length in the circumferential direction, that is, a right and left direction becomes gradually shorter upward toward the laser beam radiation side. Hence, a side surface WK1 of each tentative fixed portion WK is inclined in a manner as to downwardly spread in the circumferential direction.

The configuration of each tentative fixed portion WK having such a shape relies on the inclination of the side surface 145 of the inversion plate 140. As aforementioned in FIG. 5, the side surface 145 of the inversion plate 140 is inclined in a direction further apart from the inner wall surface 134 of the recessed portion 133 of the rivet 130 as the side surface 145 is located closer to the first surface 141 of the inversion plate 140. In addition, the laser beam radiation in the tentative fixing step is carried out while the opening of the recessed portion 133 of the rivet 130 faces upward in the vertical direction.

Consequently, the molten portion melted by the laser beam radiation is usually difficult to be collected at an upper position in the vertical direction where the distance between the inner wall surface 134 of the recessed portion 133 and the side surface 145 of the inversion plate 140 is greater. This means that the molten portion flows along the side surface 145 of the inclined inversion plate 140 in a manner as to gradually spread in the circumferential direction downward in the vertical direction. The molten portion spreadingly flowing downward becomes hardened on the way of its flowing into each tentative fixed portion WK.

After the tentative fixing step in which the tentative fixed portions WK are formed, the rivet 130 and the inversion plate 140 are joined together at the tentative fixed portions WK. Specifically, in the present embodiment, the rivet 130 and the inversion plate 140 after the tentative fixing step are partially joined together at six positions with equal intervals in the circumferential direction.

Subsequently, "3. the joining step" is carried out. This step is a step of a full-circled welding to continuously radiate the boundary between the rivet 130 and the inversion plate 140 by one round or more with the laser beam so as to join the portions at the boundary between the rivet 130 and the inversion plate 140 by one round. FIG. 6 shows a starting position S and an end position E of the laser beam radiation in the joining step. A shift direction of the laser beam radiation position from the starting position S to the end position E is indicated by an arrow C. In other words, as shown by the arrow C in FIG. 6, the shift direction of the laser beam radiation position in the present embodiment is clockwise.

In the joining step of the present embodiment, the position of the laser beam radiation is shifted by one round or more. Specifically, the laser beam radiation position is shifted from the starting position S in the arrow C direction by one round to reach the starting position S once again, and thereafter, is further shifted from the starting position S to the end position E. In FIG. 6, a lap section OL that are radiated with the laser beam twice is shown. In the joining step, as shown in FIG. 5, while the opening of the recessed portion 133 of the rivet 130 faces upward in the vertical direction, the laser beam is emitted from above this opening.

Figure 8:
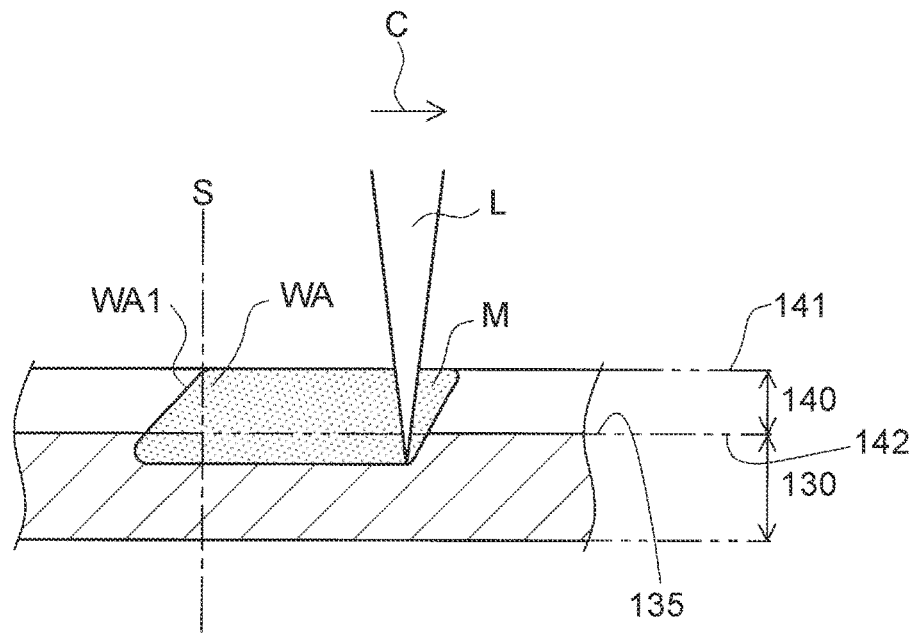
FIG. 8 is a sectional view of a vicinity of a laser beam radiating position where the radiation is started from a starting position.

FIG. 8 shows a sectional view of the vicinity of the position of the laser beam L radiation started from the starting position S. FIG. 8 is a sectional view taken along line B-B of FIG. 5, and shows a section in the circumferential direction along the boundary between the rivet 130 and the inversion plate 140. FIG. 8 shows a state in which the radiation position with the laser beam L is shifted in the arrow C direction after the laser beam radiation is started.

As shown in FIG. 8, the molten portion M is formed at the vicinity of the radiation with the laser beam L. The molten portion M is formed by a molten mixture of the vicinity of the inner wall surface 134 of the recessed portion 133 of the rivet 130 and the vicinity of the side surface 145 of the inversion plate 140 that are melted by the radiation with the laser beam L. In the vicinity of the starting position S located backward of the shift direction at which the laser beam L has already passed, a portion that was the molten portion M has become hardened into a joined portion WA.

As shown in FIG. 8, an end surface WA1 on the left end of the joined portion WA at the starting position S in the joining step is inclined in a manner as to gradually spread downward in the circumferential direction. As with the inclination of the side surface WK1 of each tentative fixed portions WK, the inclination of the end surface WA1 of the joined portion WA relies on the inclination of the side surface 145 of the inversion plate 140.

Specifically, at the starting position S of the joining step, the molten portion melted by the radiation with the laser beam L is difficult to be collected at an upper position in the vertical direction where the distance between the inner wall surface 134 of the recessed portion 133 and the side surface 145 of the inversion plate 140 is greater. Specifically, the molten portion located on an opposite side to the shift direction of the laser beam L (the left side in FIG. 8) in the vicinity of the starting position S flows downward in the vertical direction in a manner as to spread in the circumferential direction along the inclined side surface 145 of the inversion plate 140. The left end of the joined portion WA at the starting position S as shown in FIG. 8 is formed by the molten portion hardened on the way of spreadingly flowing downward.

Figure 9:
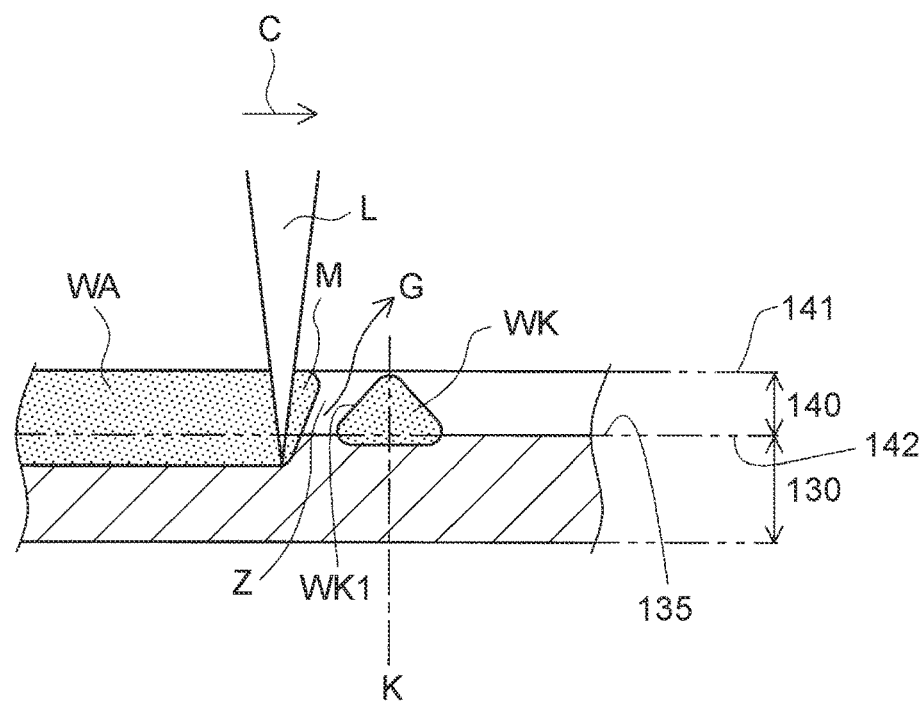
FIG. 9 is a view showing when the laser beam radiating position reaches a front of the tentative fixed portion.

The radiation position with the laser beam L passes through the tentative fixing positions K where the tentative fixed portions WK are formed on the way of shifting from the starting position S in the arrow C direction by one round. FIG. 9 shows a state in which the radiation position with the laser beam L shifting in the arrow C direction reaches the front of the tentative fixed portion WK of interest. As shown in FIG. 9, the space Z is present between the tentative fixed portion WK and the molten portion M because the joining is not completed yet. After the state as shown in FIG. 9, the molten portion M formed by the radiation with the laser beam L reaches the tentative fixed portion WK.

The molten portion M having reached the tentative fixed portion WK comes into contact with the tentative fixed portion WK from the lower part toward the upper part of the tentative fixed portion WK. As aforementioned, the side surface WK1 of each tentative fixed portion WK on the molten portion M side is inclined in a manner as to gradually spread downward in the circumferential direction. Specifically, the lower portion of the tentative fixed portion WK gradually comes closer to the molten portion M, as shown in FIG. 9.

The space Z having been present between the molten portion M and the tentative fixed portion WK of interest before the molten portion M reaches this tentative fixed portion WK is gradually filled from the lower part to the upper part thereof with the molten portion M when the molten portion M reaches this tentative fixed portion WK. Consequently, as shown in FIG. 9, since the space Z is filled from the lower part to the upper part thereof with the molten portion M, a gas G present in the space Z moves upward and exits from the opened upper part of the space Z to the outside. Accordingly, it is possible to prevent the gas G from being sealed between the molten portion M and each tentative fixed portion WK. The gas G is air or a sealed gas to be blasted toward the radiation position with the laser beam L.

Hence, when the molten portion M passes through each tentative fixed portion WK, it is possible to suppress splash caused by the gas G sealed between the molten portion M and the tentative fixed portion WK. When the molten portion M reaches each tentative fixed portion WK, the tentative fixed portion WK becomes melted once again from its portion in contact with the molten portion M to become part of the molten portion M.

Figure 10:
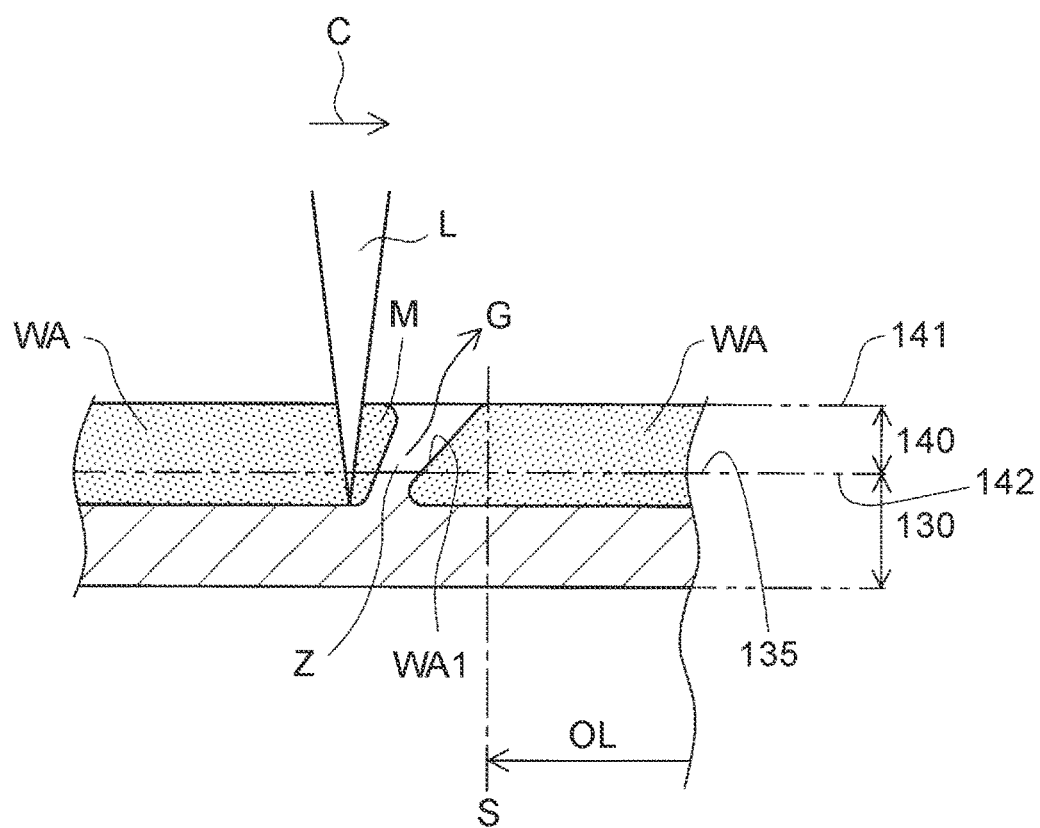
FIG. 10 is a view showing when the laser beam radiating position reaches a front of the starting position.

The radiation position with the laser beam L shifts in the arrow C direction from the starting position S by one round, and then passes through the starting position S once again. The joined portion WA is already formed at the starting position S. FIG. 10 shows that the radiation position with the laser beam L shifting in the arrow C direction reaches the front of the starting position S. As shown in FIG. 10, the space Z still remains between the joined portion WA and the molten portion M of the starting position S because they are not joined together yet. After the state of FIG. 10, the molten portion M formed by the radiation with the laser beam L reaches the joined portion WA at the starting position S.

The molten portion M having reached the joined portion WA at the starting position S comes into contact with the joined portion WA from the lower part toward the upper part of the joined portion WA. As aforementioned, the end surface WA1 of the joined portion WA on the molten portion M side at the starting position S is inclined in a manner as to gradually spread downward in the circumferential direction. This is because the joined portion WA at the starting position S has a lower portion gradually closer to the molten portion M.

The space Z having been present between the molten portion M and the joined portion WA before the molten portion M reaches the joined portion WA at the starting position S is gradually filled from the lower part toward the upper part of the space Z with the molten portion M when the molten portion M reaches the joined portion WA. Consequently, as shown in FIG. 10, since the space Z is filled from the lower part to the upper part thereof with the molten portion M, the gas G present in the space Z moves upward and exits from the opened upper part of the space Z to the outside. Accordingly, it is also possible to prevent the gas G from being sealed between the molten portion M and the joined portion WA.

When the molten portion M passes through the joined portion WA at the starting position S, the splash due to the gas G sealed between the molten portion M and the joined portion WA is also suppressed. When the molten portion M reaches the joined portion WA at the starting position S, the joined portion WA is melted once again from its position in contact with the molten portion M to become a part of the molten portion M. The radiation with the laser beam L is completed when the radiation position reaches the starting position S, passes through the lap section OL, and reaches the end position E. Through this joining step, the joined portion WA in a substantially annular shape is formed by one round with no gap along the position where the boundary between the rivet 130 and the inversion plate 140 was present. In this manner, the rivet 130 and the inversion plate 140 are joined together.

In the present embodiment, the tentative fixing step is carried out after the inserting step and before the joining step. To the contrary, if the joining step is carried out without carrying out the tentative fixing step, the inversion plate 140 becomes deformed while the laser beam radiation position on the boundary between the rivet 130 and the inversion plate 140 is radiated with the laser beam by one round. At a position where the inversion plate 140 is deformed, the side surface 145 of the inversion plate 140 comes apart from the inner wall surface 134 of the recessed portion 133, and thus it might become difficult to appropriately form the joined portion WA between the side surface 145 and the inner wall surface 134. Consequently, a gap is generated at the position of the joined portion WA between the rivet 130 and the inversion plate 140, which might be a factor of a leak failure. If the inversion plate 140 is deformed, the inversion plate 140 might not be able to be inversely deformed in an appropriate manner at the operating pressure or more.

In the present embodiment, in the tentative fixing step before the joining step, the rivet 130 and the inversion plate 140 are partially joined together with the tentative fixed portions WK. Hence, in the joining step, it is possible to suppress deformation of the inversion plate 140 while the radiation position on the boundary between the rivet 130 and the inversion plate 140 is radiated with the laser beam by one round. Therefore, it is configured to appropriately form the joined portion WA in an annular shape with no gaps by one round.

In order to appropriately join the rivet 130 and the inversion plate 140 together, it is not preferable to set the angle θ of the side surface 145 of the inversion plate 140 to be too small (FIG. 5). If this angle θ is too small, the space Z between the inner wall surface 134 of the recessed portion 133 and the side surface 145 of the inversion plate 140 becomes too small. Specifically, if the angle θ is too small, the distance on the laser beam radiation side between the inner wall surface 134 of the recessed portion 133 and the side surface 145 of the inversion plate 140 becomes too small.

If the distance on the laser beam radiation side between the inner wall surface 134 and the side surface 145 is too small, in the tentative fixing step, it might be impossible to form the tentative fixed portions WK having the side surfaces WK1 appropriately inclined in a manner as to gradually spread downward in the circumferential direction. In the joining step, at the starting position S, it might also be impossible to form the joined portion WA having the end surface WA1 appropriately inclined in a manner as to gradually spread downward in the circumferential direction. This is because the molten portion melted by the laser beam radiation is collected at an upper position in the vertical direction in a narrower distance between the inner wall surface 134 of the recessed portion 133 and the side surface 145 of the inversion plate 140, and thus amount of the molten portion to flow downward becomes insufficient. Consequently, the side surface WK1 of each tentative fixed portion WK and the end surface WA1 of the joined portion WA at the starting position S are not sufficiently inclined in a manner as to gradually spread downward in the circumferential direction, and thus these inclinations are formed at an almost vertical angle.

If the inclination of the side surface WK1 of each tentative fixed portion WK is insufficient, in the joining step, the gas G might be sealed in the space Z between each tentative fixed portion WK and the molten portion M having reached this tentative fixed portion WK after the shift of the laser beam radiation position. If the end surface WA1 of the joined portion WA at the starting position S is insufficiently inclined, the gas G might also be sealed in the space Z between the joined portion WA at the starting position S and the molten portion M having reached this joined portion WA after the shift of the laser beam radiation position. The gas G is gradually compressed by reduction of the space Z in which the gas G is sealed in accordance with the shift of the laser beam radiation position. The sealed gas G is compressed, and expands by increase in temperature due to the laser beam radiation at the same time. Consequently, the sealed gas G breaks the molten portion M in a flash, thereby causing splash of part of the molten portion M all around, which might result in joint defect.

To cope with this, in the present embodiment, the side surface 145 of the inversion plate 140 is so formed as to satisfy the following formula (1).

$$w/(h \cdot D) \geq 0.002 \tag{1}$$

where w: a length in the radial direction of the side surface 145, h: a height of the side surface 145, D: a diameter of the side surface 145 on an opposite side (the second surface 142 side) to the laser beam radiation side (the first surface 141 side).

By using the inversion plate 140 having the side surface 145 satisfying the above formula (1), in the tentative fixing step, the tentative fixed portions WK having the side surfaces WK1 each of which is sufficiently inclined in a manner as to gradually spread downward in circumferential direction are formed at the tentative fixing positions K, thereby suppressing the splash at these positions. In the joining step, there is formed at the starting position S the joined portion WA having the end surface WA1 sufficiently inclined in a manner as to gradually spread downward in circumferential direction, thereby suppressing the splash at this position.

It is preferable to set the angle θ of the side surface 145 of the inversion plate 140 (FIG. 5) not to be so great. As the angle θ is greater, the space Z between the inner wall surface 134 of the recessed portion 133 and the side surface 145 of the inversion plate 140 becomes greater. Specifically, as the angle θ is greater, the distance on the laser beam radiation side (upper side) between the inner wall surface 134 of the recessed portion 133 and the side surface 145 of the inversion plate 140 becomes greater.

If the distance on the laser beam radiation side between the inner wall surface 134 and the side surface 145 is too great, in the tentative fixing step, melting amount by the laser beam radiation becomes insufficient, and thus it might be difficult to form the tentative fixed portions WK having sufficient width dimensions in the radial direction. If the tentative fixed portions WK having insufficient width dimensions in the radial direction are formed, the joint strength obtained by the tentative fixed portions WK becomes insufficient, and thus the deformation of the inversion plate 140 in the joining step might not be appropriately suppressed. In addition, in the joining step, the melting amount by the laser beam radiation might become insufficient, and thus it might become difficult to form the joined portion WA having a sufficient radial width dimension. If the joined portion WA having an insufficient radial width dimension is formed, a gap might be generated at the position of the joined portion WA between the rivet 130 and the inversion plate 140, which might result in leak failure.

To cope with this, it is preferable to form the side surface 145 of the inversion plate 140 in a manner as to satisfy the following formula (2).

$$w/(h \cdot D) \leq 0.020 \tag{2}$$

where w: a length in the radial direction of the side surface 145, h: a height of the side surface 145 in the radial direction, D: a diameter of the side surface 145 on an opposite side (the second surface 142 side) to the laser beam radiation side (the first surface 141 side).

By using the inversion plate 140 having the side surface 145 satisfying the following formula (2), in the tentative fixing step, it is possible to secure the joint strength sufficiently by the tentative fixed portions WK. In the joining step, it is also possible to form the joined portion WA having a sufficient width, thereby suppressing leak failure.

Figure 11:
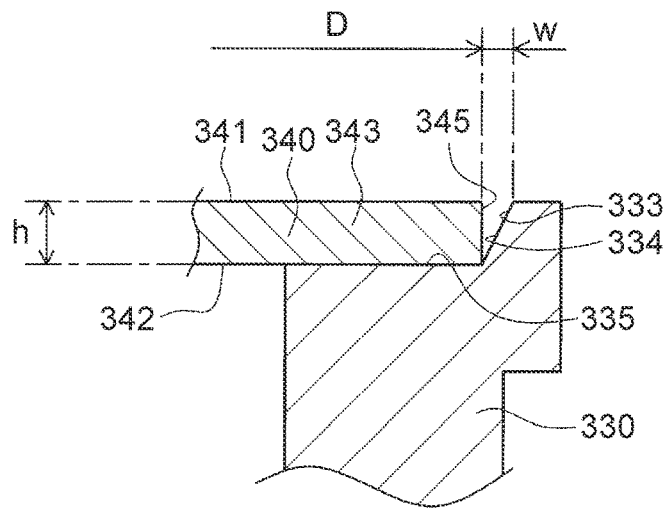
FIG. 11 is a sectional view of an inner wall surface of a recessed portion of the rivet formed to be an inclined surface.

In the above description, the case of configuring the side surface of the inversion plate to be an inclined surface has been explained, and the case of configuring the inner wall surface of the recessed portion of the rivet to be an inclined surface can also attain the same effect. FIG. 11 shows the case of configuring the inner wall surface of the recessed portion of the rivet to be an inclined surface. FIG. 11 shows a state after the inserting step. In FIG. 11, in the tentative fixing step and the joining step, the laser beam is emitted from above. As shown in FIG. 11, an inversion plate 340 is inserted in a recessed portion 333 of the rivet 330 with a first surface 341 facing upward. The inversion plate 340 is inserted into the recessed portion 333 until a second surface 342 of a circumferential edge 343 comes into contact with a bottom surface 335 of the recessed portion 333.

As shown in FIG. 11, a side surface 345 of the inversion plate 340 is formed to be parallel with a thickness direction of the inversion plate 340. Meanwhile, the inner wall surface 334 of the recessed portion 333 of the rivet 330 is formed to be an inclined surface inclined relative to a depth direction of the recessed portion 333. The inclination direction of the inner wall surface 334 of the recessed portion 333 is a direction further apart from the side surface 345 of the inversion plate 340 as the inner wall surface is located at a position closer to the laser beam radiation side. FIG. 11 shows a diameter D on a bottom surface 335 side of the inner wall surface 334 of the recessed portion 333 that is located on an opposite side to the laser beam radiation side, a length w of the inner wall surface 334 in a radial direction, and a height h of the inner wall surface 334 that is a depth of the recessed portion 333.

In the case of FIG. 11, the rivet 330 having the inner wall surface 334 of the recessed portion 333 that satisfies the aforementioned formula (1) is used. By using the rivet 330 having the inner wall surface 334 of the recessed portion 333 satisfying the above formula (1), it is possible to form the tentative fixed portions of which side surfaces are sufficiently inclined at the tentative fixing positions in the tentative fixing step, thereby suppressing the splash at these positions. In the joining step, it is also possible to form the joined portion of which end surface is sufficiently inclined at the starting position, thereby suppressing the splash at this position.

In the case of FIG. 11, it is preferable to use the rivet 330 having the inner wall surface 334 of the recessed portion 333 satisfying the aforementioned formula (2). By using the rivet 330 having the inner wall surface 334 of the recessed portion 333 that satisfies the above formula (2), in the tentative fixing step, it is possible to secure a sufficient joint strength by the tentative fixed portions. In the joining step, it is possible to form the joined portion having a sufficient width, thus suppressing leak failure.

In the joining step, it is preferable to emit the laser beam in a manner as to form the joined portion WA having a width within a range of 0.7 mm or more to 1.1 mm or less. Specifically, if the width of the joined portion WA is less than 0.7 mm, the joint strength at the joined portion WA might be insufficient, and leak failure might be caused at the joined portion WA.

If the width of the joined portion WA is more than 1.1 mm, in the joining step, amount of heat transferred to the rivet 130 and the inversion plate 140 might become too great. If too great amount of heat is transferred to the rivet 130, more amount of heat is also transferred to the external insulating member 150 and the internal insulating member 160. For example, if the internal insulating member 160 is thermally deformed, leak failure might be caused at a position where the thermal deformation occurs. If the inversion plate 140 is thermally deformed, a height of the central portion 144 after the joining step is changed by the thermal deformation thereof. After the joining step, the central portion 144 of the inversion plate 140 is joined to the conductive portion 111 of the positive electrode internal terminal 110. If the height of the central portion 144 is changed, joint defect might be caused when the conductive portion 111 is joined to the central portion 144. The width of the joined portion WA is formed within a range of 0.7 mm or more and 1.1 mm or less, thereby suppressing thermal deformation of the insulating member and the inversion plate 140 as well as forming the joined portion WA having a sufficient joint strength with no gap, thus suppressing leak failure.

In the joining step, in order to form the width of the joined portion WA to be within the range of 0.7 mm or more to 1.1 mm or less, an experiment may be previously carried out at several times by using various conditions of the laser beam radiation so as to find optimum conditions of the laser beam radiation. Conditions of the laser beam radiation may include an output of the laser beam, a scanning speed of the laser beam, and radiation patterns at laser beam radiation positions.

Figure 12:
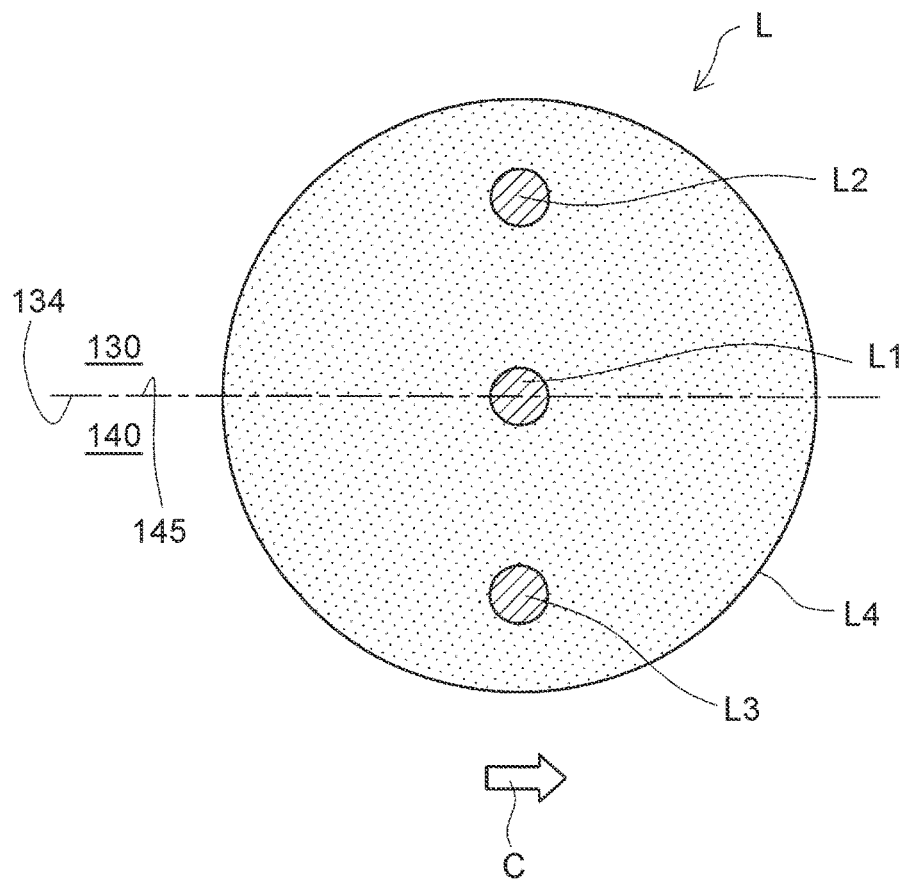
FIG. 12 is a view showing respective radiation patterns with the laser beam.

In addition, in order to form the width of the joined portion WA to be within the range of 0.7 mm or more to 1.1 mm or less, in the joining step, as radiation patterns at laser beam radiation positions, it is preferable to use patterns as shown in FIG. 12. FIG. 12 shows the radiation patterns of the laser beam L on a radiation target surface. Specifically, the radiation patterns of the laser beam L as shown in FIG. 12 are on the crown surface 132 of the rivet 130 and on the first surface 141 of the inversion plate 140.

The laser beam L as shown in FIG. 12 includes a first laser beam L1 that is located at the center, and a second laser beam L2 and a third laser beam L3 that are located respectively above and below the first laser beam L1 interposed therebetween. The laser beam L also includes a fourth laser beam L4 with which a wider area including those of the first laser beam L1, the second laser beam L2, and the third laser beam L3 is radiated. It is preferable to set the diameter of the fourth laser beam L4 to be 0.6 mm if the joined portion WA having a width being within the range of 0.7 mm or more to 1.1 mm or less is formed The boundary between the rivet 130 and the inversion plate 140 is radiated with the first laser beam L1 so as to form a keyhole at this radiation position. The rivet 130 and the inversion plate 140 are radiated with the second laser beam L2 and the third laser beam L3, respectively so as to form keyholes at these radiation positions as with the case of the first laser beam L1. A wide area on the rivet 130 and the inversion plate 140 including the boundary between the rivet 130 and the inversion plate 140 is radiated with the fourth laser beam L4, and the fourth laser beam L4 has a lower energy than that of the first laser beam L1, and is used for increasing the temperature at the radiation position.

By using the laser beam L having the radiation patterns as shown in FIG. 12, it is possible to readily form the joined portion WA having a width within the range of 0.7 mm or more to 1.1 mm or less in the joining step.

The present inventors have verified effects of the present invention by conducting the following experiment. The present experiment was conducted on Examples in which rivets and inversion plates were joined together under conditions according to the present invention and on Comparative Examples in which rivets and inversion plates were joined together under conditions different from those of the present embodiment.

Common conditions among Examples and Comparative Examples will be described, hereinafter. In the present experiment, each inversion plates having a maximum outer diameter of 18 mm and a thickness of 0.3 mm was used. A depth of the recessed portion of each rivet into which each inversion plate was inserted was set to be 0.3 mm. In the tentative fixing step, the tentative fixing by the laser beam radiation was carried out at six tentative fixing positions K as shown in FIG. 6. In the tentative fixing step, the same condition of the laser beam radiation was used among the Examples and Comparative Examples. In the joining step, as shown in FIG. 6, full-circled welding was carried out while the laser beam radiation position is shifted from the starting position S to the end position E in the arrow C direction. The beam mode of the laser beam used in each of Examples and Comparative Examples in the joining step was set to be a single mode.

Figure 14:
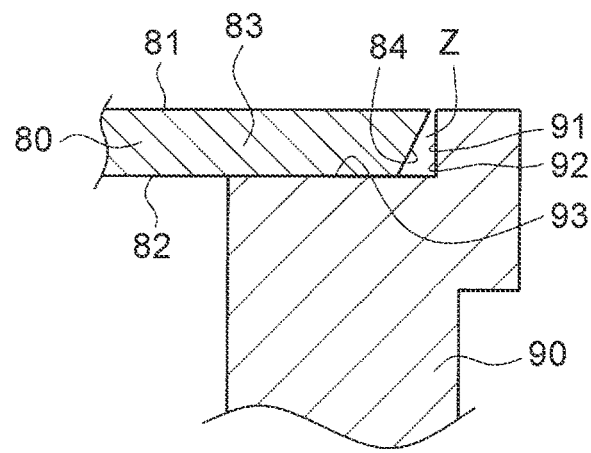
FIG. 14 is a sectional view in a radial direction of a rivet and an inversion plate of related art.
Figure 15:
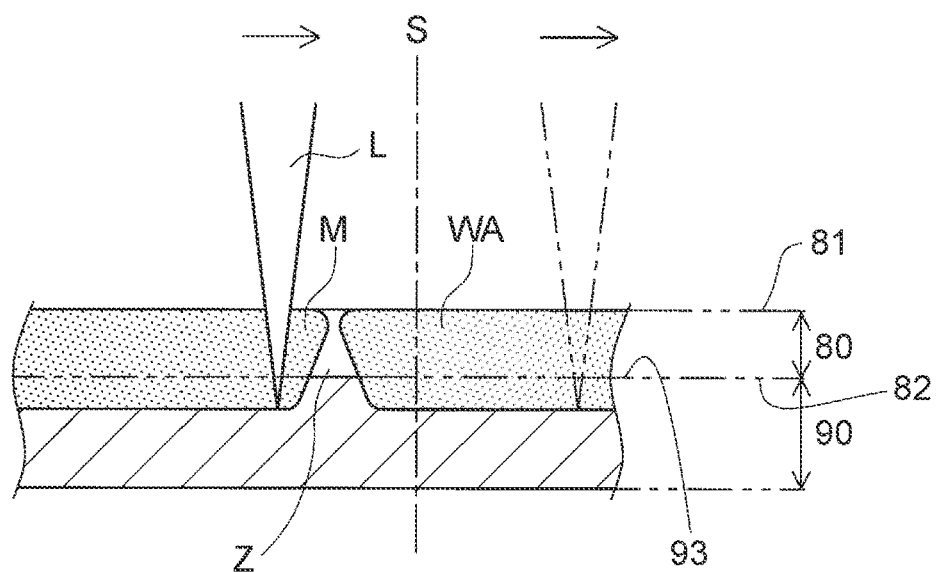
FIG. 15 is a drawing explaining laser beam welding of the related art.

The various different conditions among Examples and Comparative Examples are shown in a table of FIG. 13. "Position of Inclined surface" in FIG. 13 shows which of the side surface of the inversion plate and the inner wall surface of the recessed portion of the rivet was set to be the inclined surface. In other words, as shown in FIG. 13, in Example 4, the inner wall surface of the recessed portion of the rivet was set to be the inclined surface. In Comparative Example 3, the side surface of the inversion plate and the inner wall surface of the recessed portion of the rivet were respectively set to be parallel with the thickness direction of the inversion plate and the depth direction of the recessed portion. Other than these, in each of Examples 1 to 3 and 5 to 8, and in each of Comparative Examples 1, 2, and 4, the side surface of the inversion plate was set to be the inclined surface. In each of Examples 1 to 3 and 5 to 8, and Comparative Examples 1 and 2, the inclination direction of the side surface of the inversion plate was set to be the direction as shown in FIG. 5, and in Comparative Example 4, as shown in FIG. 14, the inclination direction of the side surface of the inversion plate was set to be a direction further apart from the inner wall surface of the recessed portion as the side surface is located at a position further apart from the laser beam radiation side.

In FIG. 13, a length w of the inclined surface in the radial direction, and a value of w/(h·D) regarding the formula (1) for each of the Examples and Comparative Examples are shown, respectively. A value of a diameter on the laser beam radiation side was used as D for calculation of a value of w/(h·D) in Comparative Example 4. In FIG. 13, each width in the radial direction of the annular joined portion formed in the joining step is shown. Of Examples and Comparative Examples, those that have different widths of the joined portions were subjected to full-circled welding by using different scanning speeds of the laser beam among the various laser beam radiation conditions in the joining step. This means that full-circled welding was carried out at a higher scanning speed of the laser beam as the joined portion had a narrower width.

FIG. 13 shows the number of splash occurrences in the joining step for each of Examples and Comparative Examples. The number of splash occurrences indicates that the number of splash occurrences in 20 joined bodies of the inversion plates and the rivets produced for each of Examples and Comparative Examples under corresponding conditions of Examples and Comparative Examples. As shown in FIG. 13, the number of splash occurrences is zero in each Example. This is because, in each Example, one of the side surface of the inversion plate and the inner wall surface of the recessed portion of the rivet that was formed to be the inclined surface had an inclination in a direction further apart from the other surface as the one surface was located at a position closer to the laser beam radiation side, and was formed under the condition satisfying the above formula (1). Hence, in each of Examples, the splash in the joining step was appropriately suppressed.

To the contrary, in each of Comparative Examples 1 and 2, the inclined surface of the side surface of the inversion plate was formed under the condition that did not satisfy the above formula (1). Specifically, in each of Comparative Examples 1 and 2, the value of w/(h·D) was too small to sufficiently incline the side surface of each tentative fixed portion and the end surface at the starting position in the joining step; thus it was impossible to suppress the splash in the joining step. In Comparative Example 3, it is found that both the side surface of the inversion plate and the inner wall surface of the recessed portion were not formed to be the inclined surfaces, and thus the splash could not be suppressed. It is found that Comparative Example 4 had the greatest number of splash occurrences. In Comparative Example 4, since the space Z on the laser beam radiation side was closed, the gas was likely to be sealed in the space Z in the joining step.

FIG. 13 also shows the number of leak failure occurrences. The number of leak failure occurrences indicates that the number of leak failure occurrences in 20 joined bodies of the inversion plates and the rivets produced for each of Examples and Comparative Examples under corresponding conditions of Examples and Comparative Examples. It is found that leak failure was suppressed in each of Examples 1 to 6 in which the joined portion having a width within the range of 7 mm or more to 1.1 mm or less was formed in the joining step.

In Example 7 having the joined portion of which width was less than 7 mm and in Example 8 having the joined portion of which width was more than 1.1 mm, it is found that the leak failure was not completely suppressed. It can be considered that in Example 7, because the width of the joined portion was less than 0.7 mm, a gap could not be completely prevented from being formed in a part of the joined portion. It can be considered that in Example 8, amount of heat transferred to the rivet became great, so that partial deformation of the insulating member could not be completely prevented in the joining step. In addition, it can be considered that in Example 8, the above formula (2) was not satisfied, so that the gap was formed in the joined portion, which resulted in generation of the leak failure.

As aforementioned in details, in the producing method of the battery 1 according to the present embodiment, the inserting step and the joining step are carried out. In the inserting step, the inversion plate 140 is inserted into the recessed portion 133 of the rivet 130 until the circumferential edge 143 of the inversion plate 140 comes into contact with the bottom surface 135 of the recessed portion 133. In the joining step, the rivet 130 having the recessed portion 133 in which the inversion plate 140 is inserted is set such that the opening of the recessed portion 133 faces upward in the vertical direction. In this state, the boundary at which the inner wall surface 134 of the recessed portion 133 faces the side surface 145 of the inversion plate 140 is continuously radiated with the laser beam from above by one round or more. The joined portion WA in an annular shape is continuously formed at the laser beam radiation position so as to join the rivet 130 and the inversion plate 140 together. The side surface 145 of the inversion plate 140 is formed to be an inclined surface inclined in a direction further apart from the inner wall surface 134 of the recessed portion 133 as this side surface is located at a position closer to the laser beam radiation side. In addition, in the inversion plate 140, the side surface 145 that is the inclined surface satisfies the above formula (1). Accordingly, it is possible to realize the producing method of the sealed battery capable of suppressing the splash at the time of joining the inversion plate.

The present embodiment is merely an exemplification, and does not limit the present invention at all. Hence, the present invention may naturally be modified and changed in a various manner within the spirit thereof. For example, in the aforementioned present embodiment, the battery 1 that is a lithium ion secondary battery has been described, but the present invention may be applicable to a sealed battery having a CID of another type. For example, the materials of the rivet 130 and the inversion plate 140 may not be limited to aluminum, and the present invention may be applicable to any combination of materials as long as the materials can be joined together via the laser beam welding.

What is claimed is:

1. A producing method of a sealed battery, the sealed battery including:
a battery case housing an electrode body constituted of positive and negative electrode plates inside the battery case, the battery case including a through-hole;
an external terminal located outside the battery case;
a current interrupt device disposed between the electrode body and the external terminal, the current interrupt device configured to be in a conductive state to conduct the electrode body to the external terminal at a normal internal pressure time when an internal pressure of the battery case is less than a predetermined pressure, and configured to be in a cut-off state to cut off the conductivity between the electrode body and the external terminal at an abnormal internal pressure time when the internal pressure of the battery case becomes equal to or more than the predetermined pressure, the current interrupt device is located inside the battery case;
an internal terminal connected to the electrode body;
a connecting member having a first end connected to the external terminal, the connecting member having a second end extending from the first end through the through-hole to the inside of the battery case, the connecting member including a circular recessed portion opening in a surface of the second end and a hole opening in a bottom surface of the recessed portion; and
an inversion plate that is a plate member having a circular outer shape, the inversion plate joined, in a state in which the inversion plate is inserted in the recessed portion, to the connecting member at a circumferential edge of the inversion plate located radially outward; in the conductive state, the inversion plate curved at a central portion of the inversion plate surrounded by the circumferential edge in a manner as to be convex toward the internal terminal so that at least a part of a central portion is connected to the internal terminal;
in the cut-off state, the inversion plate inversely deformed such that the central portion moves apart from the internal terminal to generate a gap between the central portion and the internal terminal so as to cut off the conductivity,
the producing method of the sealed battery comprising:
inserting the inversion plate into the recessed portion of the connecting member until the circumferential edge comes into contact with the bottom surface of the recessed portion; and
in a state in which the inversion plate is inserted in the recessed portion of the connecting member, and the opening of the recessed portion faces upward in a vertical direction, continuously radiating a laser beam from above to a boundary at which an inner wall surface of the recessed portion faces an outer side surface that is a radially outer surface of the inversion plate by one round or more to form an annular continuous joined portion at a position corresponding to the boundary so as to join the connecting member and the inversion plate together, wherein the inner wall surface in a circular shape of the connecting member is an inclined surface inclined further apart from the outer side surface of the inversion plate as the inclined surface is located closer to a laser beam radiation side, or the outer side surface of the inversion plate is an inclined surface inclined further apart from the inner wall surface in a circular shape of the connecting member as the inclined surface is located closer to the laser beam radiation side, and the inclined surface satisfies a formula: $w/(h \cdot D) \geq 0.002$, where w represents a length of the inclined surface in a radial direction, h represents a height of the inclined surface, and D represents a diameter of the inclined surface on an opposite side to the laser beam radiation side.

2. The producing method of the sealed battery (1) according to claim 1, wherein the inclined surface further satisfies a formula: $w/(h \cdot D) \leq 0.020$.

3. The producing method of the sealed battery (1) according to claim 1, wherein after the inversion plate is inserted into the recessed portion of the connecting member until the circumferential edge comes into contact with the bottom surface of the recessed portion, and before the connecting member and the inversion plate are joined together, in a state in which the inversion plate is inserted in the recessed portion of the connecting member, and the opening of the recessed portion faces upward in a vertical direction, part of the boundary is radiated with the laser beam from above so as to form tentative fixed portions at radiation positions of the laser beam, and each of the tentative fixed portions has a sectional shape in a circumferential direction along the boundary having a shorter length as the sectional shape is located at a position closer to the laser beam radiation side.

4. The producing method of the sealed battery according to claim 1, wherein when the connecting member and the inversion plate are joined together, the laser beam is emitted in a manner as to form the joined portion having a width being within a range of 0.7 mm or more to 1.1 mm or less.

* * * * *